United States Patent Office 3,312,727
Patented Apr. 4, 1967

3,312,727
ORGANOSILICON COMPOUNDS
Robert L. Merker, Pittsburgh, Pa., assignor to Dow Corning Corporation, Midland, Mich., a corporation of Michigan
No Drawing. Filed Feb. 3, 1965, Ser. No. 430,168
6 Claims. (Cl. 260—448.2)

This invention relates to tris-triorganosilylphenylbenzene and to siloxanes derived therefrom.

It is the object of this invention to prepare novel organosilicon compounds useful as heat transfer fluids and thermally stable resins from which one can made protective coatings and electrical insulation.

This invention relates to compositions of the formula

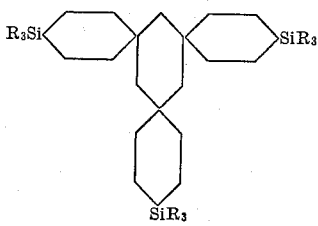

in which R is selected from the group consisting of hydrocarbon, fluorohydrocarbon, hydrogen, hydroxyl and hydrolyzable groups.

The silanes of this invention are best prepared by reacting halosilanes of the formula $R_3SiCl$ where R is as above defined with tris(para-bromophenyl)benzene in ether solution in the presence of butyl lithium in accordance with the equation:

$(BrC_6H_4)_3C_6H_3 + 3C_4H_9Li + 3R_3SiCl \rightarrow$
$3C_4H_9Br + 3LiCl + (R_3SiC_6H_4)_3C_6H_3$ The temperature at which the reaction is carried out is not critical and will vary depending upon the nature of the substituents on the silicon. In general, however, temperatures of from 0 to 30° C. are satisfactory. In those cases in which R is halogen, a large molar excess of the $R_3SiCl$ compound should be employed in order to produce reasonable yields of silanes such as $(Cl_3SiC_6H_4)_3C_6H_3$ Those compounds in which R is an acyl group are best prepared by reacting the corresponding chlorosilane with the corresponding acid salt or acid anhydride. For example, the compound tris(triacetoxysilylphenyl)benzene can be prepared by reacting tris(trichlorosilylphenyl)benzene with acetic anhydride.

Tris-para-bromophenylbenzene employed as a starting material in this invention can be prepared by condensing para-bromoacetophenone in refluxing toluene in the presence of an acid catalyst such as p-toluene sulfonic acid. This reaction proceeds by way of a condensation of three mols of the bromoacetophenone to give the tris-p-bromophenylbenzene and three mols of water.

This invention also relates to siloxanes containing at least one siloxane unit of the formula

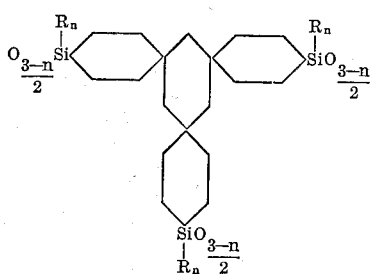

in which R is as above defined and each $n$ has a value from 0 to 3 inclusive, the total value of $n$ in said unit being from 0 to 8 inclusive, any remaining siloxane units in said siloxane being of the formula $R'_mSiO_{4-m/2}$ in which R' is of the group hydrocarbon, halohydrocarbon, hydrogen, hydroxyl and hydrolyzable groups, and $m$ has an average value from 0 to 3 inclusive.

The siloxanes of this invention are made by the hydrolysis and condensation of the corresponding hydrolyzable silanes. The copolymers within the scope of this invention are made by the cohydrolysis or cocondensation of the above defined silanes with silanes of the formula $R'_mSiX_{4-m}$, where X is a hydrolyzable group.

It should be understood that both R and R' in the siloxanes of this invention can be a hydrolyzable group as defined above or a silicon bonded hydroxyl group. Such siloxanes are made by the partial hydrolysis or partial condensation of the corresponding silanes.

For the purpose of this invention R can be any hydrocarbon radical such as aliphatic hydrocarbon radicals such as methyl, ethyl, propyl, octadecyl, vinyl, allyl, butadienyl, and isopropyl; cycloaliphatic hydrocarbon radicals such as cyclopentyl, cyclohexyl, cyclohexenyl, methylcyclohexyl, or 3-cyclohexylpropyl; aralkyl hydrocarbon radicals such as benzyl, beta-phenylethyl, or beta-naphthylethyl; or aromatic hydrocarbon radicals such as phenyl, xenyl, naphthyl, tolyl, xylyl, or anthracyl; any fluorohydrocarbon radical such as $\alpha,\alpha,\alpha$-trifluorotolyl, 1,1,1-trifluoropropyl, $C_7F_{15}CH_2CH_2$— or perfluorovinyl. R can also be any silicon-bonded hydrolyzable radical for example halogen such as chlorine or fluorine, —OR'' radicals, where R'' is hydrocarbon or halohydrocarbon such as methoxy, ethoxy, isopropoxy, butoxy, beta-methoxyethoxy, beta-ethoxyethoxy, or —(OCH₂CH₂)₄OH, beta-chloroethoxy, allyloxy, phenoxy, chlorophenoxy, cyclohexyloxy, cyclohexenyloxy, fluorocyclohexyloxy; acyloxy radicals such as acetoxy, propionyloxy, octadecanoyloxy, and nitrogen-containing hydrolyzable groups such as isocyanate, $X_2C=NO—$,

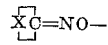

$X_2NO—$, and $X_2N—$ in which X is hydrocarbon such as methyl, ethyl, phenyl, cyclohexyl, allyl, or cyclohexenyl. In those radicals of the formula

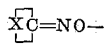

X is a divalent hydrocarbon radical derived from compounds such as cyclohexanone.

In addition to the above hydrolyzable radicals the silicon atoms can be attached to radicals such as sulfate, i.e. —OSO₂OY in which Y is hydrogen or hydrocarbon radicals, hydrosulfide, or substituted hydrosulfide radicals in which the substituents are hydrocarbon or halohydrocarbon radicals.

R' can be any of the radicals specified for R and in addition can be any halohydrocarbon radical such as chloromethyl, bromophenyl, fluorocyclohexyl, chloropropyl and CH₂=CClCH₂CH₂—.

The following examples are illustrative only and should not be construed as limiting the invention which is properly delineated in the appended claims. In the formulae below, abbreviations Me for methyl and Et for ethyl are used.

*Example 1*

In a flask cooled by an ice water bath 21.2 g. of butyl lithium dissolved in 200 cc. of heptane was added to 40 g. of tris-para-bromophenylbenzene in 400 cc. of diethyl ether. After 16 hours this mixture was added in 50 cc. portions to 37.8 g. of dimethylchlorosilane in 40 cc. of diethyl ether. During the addition the reaction mixture was cooled in an ice water bath. After one hour the reaction products were washed with water and the liquid layers of the filtrate were separated and the organic layer washed, dried and the solvents were evaporated leaving a crude solid. This material was recrystallized from 350 cc. of a mixture of 85% by volume ethanol and 15% by volume toluene to give 1,3,5-tris(p-dimethylsilylphenyl)benzene, melting 149 to 150° C.

*Example 2*

To a refluxing mixture of 22.1 g. of tris(dimethylsilylphenyl)benzene and 71.5 cc. of ethanol was added a small piece of sodium. After the theoretical amount of hydrogen had evolved, the mixture was cooled at room temperature and added to 7.9 g. of sodium hydroxide in 48.5 cc. of ethanol and 5.5 cc. of water. After prolonged stirring 7.9 g. of sodium hydroxide and 54 cc. of water was added. After half an hour the product was filtered and the filtrate was added with stirring to 1100 cc. of ice water which contained 23.7 g. of acetic acid. The precipitate which immediately formed was dissolved in diethyl ether and the ether solution was washed with water and dried over sodium sulfate. The ether was evaporated and the product was recrystallized from toluene to give the compound 1,3,5-tris(p-hydroxydimethylsilylphenyl)benzene, melting 210 to 212° C.

*Example 3*

The silanol of Example 2 was refluxed with tetramethylguanidine-di-2-ethylhexoate in benzene for several hours. An insoluble homopolymer was obtained having the unit formula $$(O_{1/2}\overset{Me_2}{\underset{|}{Si}}C_6H_4)_3C_6H_3$$

*Example 4*

3.6 g. of tris-hydroxydimethylsilylphenyl-benzene was dissolved in 70 cc. of toluene. To this was added .93 g. of trimethylacetoxysilane and the mixture was refluxed for one hour. 57 cc. of solvent were distilled from the mixture and .02 g. of tetra-methylguanidine-di-2-ethylhexoate was added. After refluxing for 20 minutes, a resinous product was obtained which was a copolymer having units of the formula $$(O_{.5}\overset{Me_2}{\underset{|}{Si}}C_6H_4)_3C_6H_3 \text{ and } Me_3SiO_{.5}$$

*Example 5*

A solution of 10 g. of tris-hydroxydimethylsilylphenylbenzene in 50 cc. of tetrahydrofuran was added to 48.7 g. of dimethyldichlorosilane and 6.2 g. of trimethylchlorosilane. The mixture was cooled in an ice bath. After 15 minutes, 25 cc. of water was added and the mixture was diluted with benzene, washed with water and sodium bicarbonate and dried over sodium sulfate. The solvents were distilled through an azeotrope trap while heating the mixture to a temperature of 150° C., .04 g. of potassium hydroxide was then added and the mixture refluxed for 3.75 hours. The resulting product was a fluid having a viscosity of 19.70 cs. at 25° C. which was a copolymer of the following siloxane units $$(O_{.5}\overset{Me_2}{\underset{|}{Si}}C_6H_4)_3C_6H_3, Me_2SiO \text{ and } Me_3SiO_{.5}$$

*Example 6*

The compound $(LiC_6H_4)_3C_6H_3$ is prepared by reacting $(BrC_6H_4)_3C_6H_3$ with butyl lithium in accordance with the procedure set forth in the first sentence of Example 1. When an ether solution of the phenyl lithium compound is added to an ether solution of the following silanes in the amounts indicated at a temperature of about 0° C. the following products are obtained.

| Silane | Mols of silane per mole of Li Compound | Product |
|---|---|---|
| SiCl₄ | 10 | (Cl₃SiC₆H₄)₃C₆H₃ |
| C₁₈H₃₇Si(OMe)₂Cl | 4 | [(MeO)₂Si(C₁₈H₃₇)C₆H₄]₃C₆H₃ |
| C₇F₁₅CH₂CH₂Si(Me)(OMe)Cl | 4 | [C₇F₁₅CH₂CH₂Si(Me)(OMe)C₆H₄]₃C₆H₃ |
| C₂H₅Si(Me)(OMe)Cl | 4 | [C₂H₅Si(Me)(OMe)C₆H₄]₃C₆H₃ |
| C₆H₅Si(OEt)₂Cl | 4 | [(EtO)₂Si(C₆H₅)C₆H₄]₃C₆H₃ |
| 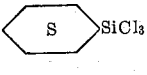 | 10 | 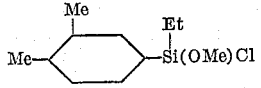 |
| C₆H₅CH₂CH₂Si(OCHMe₂)₂Cl | 4 | [(Me₂CHO)₂Si(CH₂CH₂C₆H₅)C₆H₄]₃C₆H₃ |
| C₆H₅C₆H₄Si(OMe)₂Cl | 4 | [C₆H₅C₆H₄Si(OMe)₂C₆H₄]₃C₆H₃ |
| 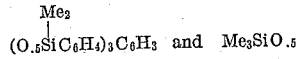 | 4 | 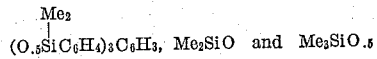 |
| Me₃SiCl | 4 | (Me₃SiC₆H₄)₃C₆H₃ |

Example 7

When the hydrolyzable products of Example 6 are hydrolyzed under standard conditions and the hydrolyzates condensed, the following siloxanes are obtained.

$(O_{1.5}SiC_6H_4)_3C_6H_3$

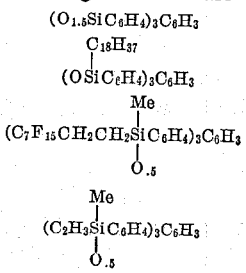

$(C_6H_5CH_2CH_2\underset{\underset{O_{.5}}{|}}{\overset{\overset{Me}{|}}{Si}}C_6H_4)_3C_6H_3$ $(C_2H_3\underset{\underset{O_{.5}}{|}}{\overset{\overset{Me}{|}}{Si}}C_6H_4)_3C_6H_3$ $(O\underset{\underset{}{}}{\overset{\overset{C_6H_5}{|}}{Si}}C_6H_4)_3C_6H_3$

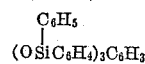

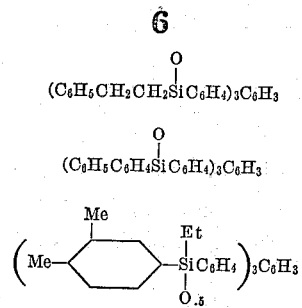

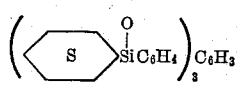

Example 8

When the following chlorosilanes are reacted with the following compounds the following products are obtained.

|   | Chlorosilane | Compound | Mols | Product |
|---|---|---|---|---|
| 1 | $C_6H_3(C_6H_4SiCl_3)_3$ | $(MeCO)_2O$ | 9 | $C_6H_3[C_6H_4Si(OOCMe)_3]_3$ |
| 2 | $C_6H_3(C_6H_4\overset{\overset{C_6H_5}{|}}{Si}Cl_2)_3$ | $Me_2C=NOH$ | 7 | $C_6H_3[C_6H_4\overset{\overset{C_6H_5}{|}}{Si}(ON=CMe_2)_2]_3$ |
| 3 | $C_6H_3(C_6H_4\overset{\overset{C_4H_9}{|}}{Si}Cl_2)_3$ | $Et_2NOH$ | 7 | $C_6H_3[C_6H_4\overset{\overset{C_4H_9}{|}}{Si}(ONEt_2)_2]_3$ |
| 4 | $C_6H_3(C_6H_4\overset{\overset{C_6H_5}{|}}{Si}Cl)_3$ | $(C_3H_5)_2NH$ | 4 | $C_6H_3[C_6H_4\overset{\overset{C_6H_5}{|}}{Si}N(C_3H_5)_2]_3$ |
| 5 | $C_6H_3(C_6H_4\overset{\overset{Me}{|}}{Si}Cl_3)_3$ | $ClC_6H_4OH$ | 10 | $C_6H_3[C_6H_4\overset{\overset{Me}{|}}{Si}(OC_6H_4Cl)_3]_3$ |
| 6 | $C_6H_3(C_6H_4SiCl_3)_3$ | $(CF_3CO)_2O$ | 9 | $C_6H_3[C_6H_4Si(OOCCF_3)_3]_3$ |
| 7 | $C_6H_4(C_6H_4SiCl_3)_3$ | $\overline{CH_2CH_2O}$ | 9 | $C_6H_3[C_6H_4Si(OCH_2CH_2Cl)_3]_3$ |
| 8 | $C_6H_4(C_6H_3\overset{\overset{Me_2}{|}}{Si}Cl)_3$ | $KSH$ | 4 | $C_6H_3(C_6H_4\overset{\overset{Me_2}{|}}{Si}SH)_3$ |
| 9 | $C_6H_4(C_6H_3\overset{\overset{Me_2}{|}}{Si}Cl)_3$ | $KNCO$ | 4 | $C_6H_3(C_6H_4\overset{\overset{Me_2}{|}}{Si}NCO)_3$ |

Runs 2 to 5 are best carried out in the presence of picoline as a HCl acceptor.

Example 9

When the following silanes are cohydrolyzed and cocondensed in the presence of KOH the following siloxane copolymers are obtained.

|   | Silane | Mol percent | Copolymer | Mol percent |
|---|---|---|---|---|
| 1 | $C_6H_3(C_6H_4\overset{\overset{Me_2}{|}}{Si}Cl)_3$ | 10 | $C_6H_3(C_6H_4\overset{\overset{Me_2}{|}}{Si}O_{.5})_3$ | 10 |
|   | $C_6H_5SiCl_3$ | 20 | $C_6H_5SiO_{1.5}$ | 20 |
|   | $C_6H_5(Me)SiCl_2$ | 50 | $C_6H_5(Me)SiO$ | 50 |
|   | $C_2H_3\overset{\overset{Me}{|}}{Si}SiCl_2$ | 10 | $C_2H_3\overset{\overset{Me}{|}}{Si}O$ | 10 |
| 2 | $C_{18}H_{37}SiCl_3$ | 10 | $C_{18}H_{37}SiO_{1.5}$ | 10 |
|   | $C_6H_3(C_6H_4SiCl_3)_3$ | 10 | $C_6H_3(C_6H_4SiO_{1.5})_3$ | 10 |
|   | $Si(OEt)_4$ | 10 | $SiO_2$ | 10 |
|   | (Et-thiophene)$SiCl_2$ | 40 | (Et-thiophene)$SiO$ | 40 |
|   | Me-(Me-cyclohexyl)-$SiCl_2$ | 10 | Me-(Me-cyclohexyl)-$SiO$ | 10 |
|   | $C_6H_5\overset{\overset{Me}{|}}{C}H\overset{\overset{Me}{|}}{C}H_2SiCl_2$ | 10 | $C_6H_5\overset{\overset{Me}{|}}{C}H\overset{\overset{Me}{|}}{C}H_2SiO$ | 10 |
|   | $C_2H_3\overset{\overset{Me_2}{|}}{Si}Cl$ | 20 | $C_2H_3\overset{\overset{Me_2}{|}}{Si}O_{.5}$ | 20 |

| | Silane | Mol percent | Copolymer | Mol percent |
|---|---|---|---|---|
| 3 | C₆H₃(C₆H₄ṠiCH₂CH₂CF₃)₃ with Cl above Si and Me below | 20 | C₆H₃(C₆H₄ṠiCH₂CH₂CF₃)₃ with O.₅ above Si and Me below | 20 |
| | Cl₂C₆H₃SiCl₃ | 20 | Cl₂C₆H₃SiO₁.₅ | 20 |
| | CF₃CH₂CH₂ṠiCl₂ with Me above | 40 | CF₃CH₂CH₂ṠiO with Me above | 40 |
| | C₂F₅CH₂CH₂ṠiCl with Me₂ above | 20 | C₂F₅CH₂CH₂ṠiO.₅ with Me₂ above | 20 |

*Example 10*

When a mixture of 1 mole of

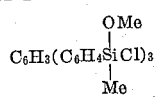

and 2 mols of phenylmethylmethoxychlorosilane are hydrolyzed with enough water to react with all the silicon bonded chlorine, a siloxane copolymer of the following average formula is obtained:

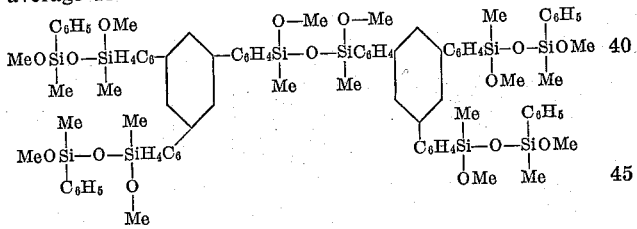

That which is claimed is:

1. A composition of the formula

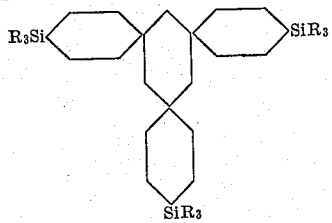

in which each R is selected from the group consisting of hydrocarbon, fluorohydrocarbon, hydrogen, hydroxyl, and hydrolyzable groups.

2. A composition of the formula

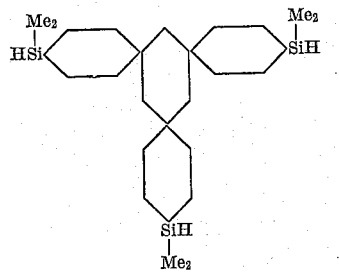

where Me is a methyl radical.

3. A composition of the formula

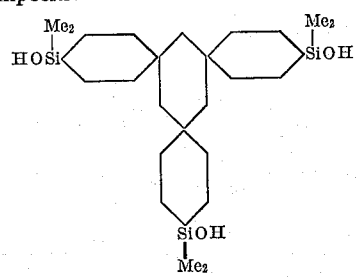

where Me is a methyl radical.

4. A siloxane containing at least one unit of the formula

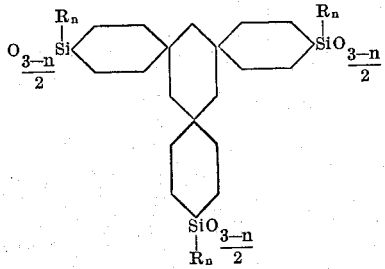

in which R is selected from the group consisting of hydrocarbon, fluorohydrocarbon, hydrogen, hydroxyl, and hydrolyzable radicals, each $n$ has a value from 0 to 3 inclusive and the total value of $n$ in the unit being from 0 to 8 inclusive, any remaining siloxane units in said siloxane being of the formula $R'_m SiO_{4-m/2}$ in which R' is selected from the group consisting of hydrocarbon, halohydrocarbon, hydrogen, hydroxyl and hydrolyzable radicals, and $m$ has an average value from 0 to 3 inclusive.

5. A copolymer consisting of units of

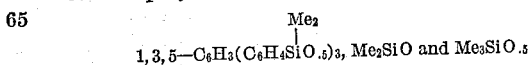

in which Me is the methyl radical.

6. A copolymer consisting of units of

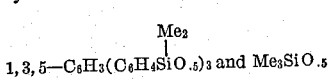

where Me is the methyl radical.

(References on following page)

References Cited by the Examiner

UNITED STATES PATENTS

| | | | |
|---|---|---|---|
| 2,969,480 | 12/1954 | Gordon et al. | 260—46.5 |
| 2,819,282 | 1/1958 | Clark | 260—448.2 |
| 3,139,448 | 6/1964 | Hardy et al. | 260—448.2 |
| 3,202,634 | 8/1964 | Merker | 260—46.5 |

TOBIAS E. LEVOW, *Primary Examiner.*

LEON J. BERCOVITZ, *Examiner.*

M. I. MARQUIS, P. F. SHAVER, *Assistant Examiners.*